July 26, 1966  F. E. MENDES 3RD  3,263,062
CONTROL SYSTEM

Filed Dec. 10, 1963  3 Sheets-Sheet 1

INVENTOR
FRANK EMMONS MENDES, 3RD.

BY

ATTORNEY

United States Patent Office 3,263,062
Patented July 26, 1966

3,263,062
CONTROL SYSTEM
Frank Emmons Mendes 3rd, Camden, S.C., assignor to E. I. du Pont de Nemours and Company, Wilmington, Del., a corporation of Delaware
Filed Dec. 10, 1963, Ser. No. 329,570
1 Claim. (Cl. 219—494)

This invention relates to a system for controlling a variable. More particularly, the invention relates to means for maintaining a condition such as temperature at a predetermined level when severe upsets occur in a system.

In many processes one condition, such as temperature, concentration or pressure may require rapid adjustments as the demands of the process change. For example, the quantity of a heating fluid for maintaining a selected temperature for a reaction will increase if an additional reactor is placed on-stream. Similarly, in an extrusion process for spinning synthetic fiber the quantity of heat required by the process will be decreased as spinning positions are taken off-stream.

Heretofore, systems for controlling variations in a condition such as temperature have not been entirely satisfactory where the demand has wide variations.

Included among the well-known methods and devices for regulating temperature by means of manipulating heat input from electric heaters is the use of switches which turn separate heater elements on and off in a stepping fashion as the demand for heat varies. In another system, the temperature is regulated by continuously varying the power to a single heating element or system by manipulating the supply voltage to the heaters by means of a reactor, auto transformer, or other device. Both systems have undesirable features. When any heater is suddenly switched on or off, there tends to result an upset in the electrical supply system until voltage regulators in the supply can correct for this sudden demand. Furthermore, unless the switched heater input capacity exactly matches the change in heat input demand, the temperature which is being regulated may be offset from the desired value. Then, in order to reach and maintain the desired temperature, one heating element must be cycled on and off so that the average heat input per unit time will be equal to the average demand rate. In some devices of this type, this tends to produce a corresponding temperature cycling that may be detrimental to the process for which the temperature is being regulated. In the second type of device where input is continuously manipulated, changes in heat input demand sometimes are so great that the range of variation available in the continuously variable heating element is inadequate. In this case, additional heaters are employed which are of the on-off type commonly called base heating elements. When such base heating elements are required, their use may produce the same disadvantages of system upsets during switching and temperature cycling mentioned above. If base heating elements are not employed in such cases, large and costly power imput regulating devices must be employed which in general cannot maintain good regulation particularly when operating in the lower end of their range.

An object of this invention is to provide a means for eliminating system upsets when automatic base load switching input devices are employed in the regulation of a process system. Another object of the invention is to minimize temperature cycling that may result from switching on and off base load heaters. A further and more general object is to provide process condition regulation of a variety of types wherein no system upset results from step-wise changes in condition modifying input.

In general, this invention comprises a system for controlling a process condition (such as temperature, pressure or concentration) by regulating the condition in response to a signal furnished by a recorder/controller or monitoring device of well-known type wherein the signal is received from a sensing means. Regulation to effect changes in or influence the condition is provided by a novel combination of elements including one device with continuously variable output level and at least one device of fixed output potential having a lesser output capacity. Amplification and switching means actuate one or more of the selected fixed output devices at required demand levels and at the same time reduce the output from the variable output device an amount substantially equal to the output of the fixed device to prevent sudden surges in input to the system and sudden demands on the supply source used for the output devices. The switching means includes a first input signal amplifying relay which may or may not be biased and one or more auxiliary amplifying relays which are biased to preselected levels. One or more on-off switches each present to be actuatable at different on and off signal levels, and one or more control valves actuated by one of the on-off switches complete the system.

While the preferred embodiment of this invention will be described with reference to regulation of the temperature of a fluid passing through a heat exchanger, the objects previously set forth are also attained by many other uses of the system.

These and other objectives and advantages will be apparent from the following specification wherein reference is made to the accompanying drawings in which.

Figure 1:
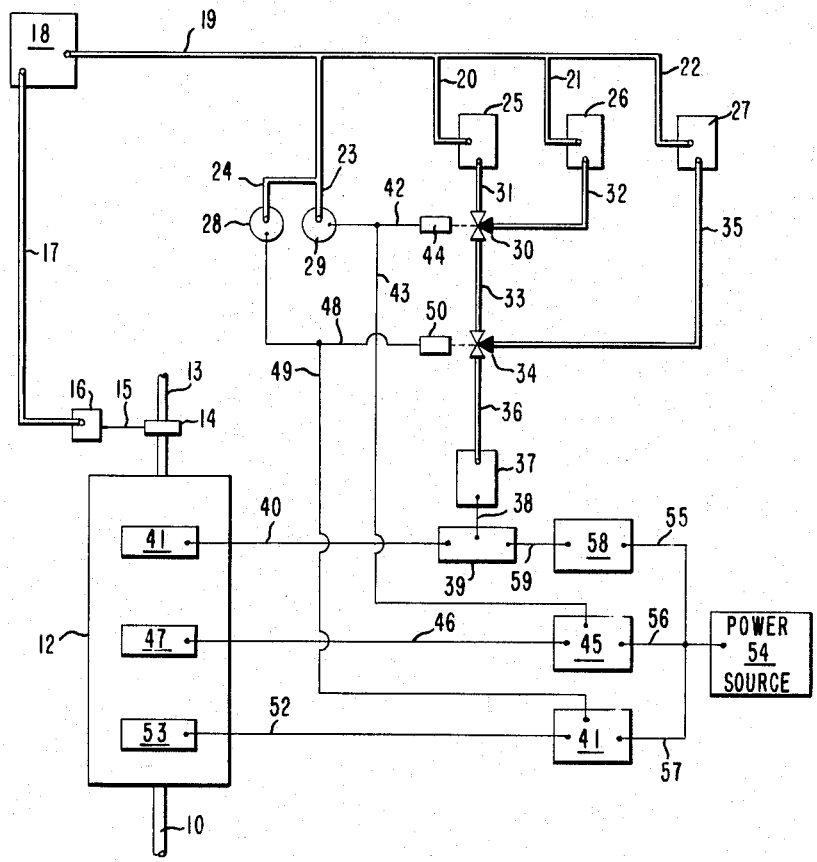
FIGURE 1 is a diagrammatic illustration of a temperature regulator system employing the control system of this invention.

Referring now to FIG. 1, in the embodiment illustrated, a material being processed is introduced through conduit 10, into a heat exchanger 12 and further transported through conduit 13. In conduit 13 there is located a temperature sensor 14 connected through line 15 to direct acting pressure transmitter 16 and line 17 to a reverse acting recorder controller 18. In this embodiment the sensor and transmitter are one unit, namely a Foxboro Model 45, and the recorder/controller is in this case a Foxboro Model 40 RA5. The output signal from controller 18 is transmitted over lines 19, 20, 21, 22, 23 and 24 to, respectively, first, second and third pneumatic amplifying relays 25, 26 and 27 and to pressure switches 28 and 29. Relays 25, 26 and 27 are commercially available devices obtained from Moore Products Company as Relay Model 68–2 (FIGURE 6, Moore Products Company Bulletin AD68) class 5, number 3; and the pressure switches are United Electric Company No. 354 with adjustable difference to 1½ p.s.i. and calibrated range 0 to 50 lbs. per square inch. Relays 25 and 26 are, respectively, connected to solenoid valve 30 over lines 31 and 32. Line 33 connects solenoid valve 30 to a second solenoid valve 34. These are commercial valves, i.e. ASCO #830225R. Line 35 connects relay 27 to solenoid valve 34. The output from valve 34 is transmitted over line 36 to pressure/current transducer 37 (Foxboro type PC3–15, Model 634–2AS–U–10–50). Output of transducer 37 is transmitted over electrical connectors 38 to the signal input terminals of a power control saturable reactor 39 (General Electric Company Model 9T27Y9453) which furnishes power over line 40 to first heating element 41 located within the heat exchanger 12. Connected to pressure switch 29 over electrical lines 42 and 43, respectively, are the solenoid 44 of valve 30 and power relay 45. The latter is connected over electrical line 46 to a second heating element 47 also located within the heat exchanger 12. From pressure switch 28, electrical lines 48 and 49, respectively, are connected to solenoid 50 of valve 34 and to power relay 51. This latter is in turn, connected through line 52 to a third heating element 53 located within the heat exchanger 12. Finally, a power source 54 is connected over lines 55, 56 and 57, respectively, to power relays 58, 45 and 51 respectively. Relay 58 is connected through line 59 to saturable reactor 39.

In this embodiment, pressure switch 29 is adjusted to be actuated at 8.5 p.s.i. input signal and deactivated only when the input signal drops below 7 p.s.i. Similarly pressure switch 28 is adjusted to be actuated at 11.5 p.s.i. input signal and deactivated at 10 p.s.i. Amplifying relay 25 in this embodiment is arranged so that an input signal ranging from 3 to 9 p.s.i. gives an output signal from 3 to 15 p.s.i. Relay 26 on the other hand is biased such that an input signal is required in the range from 6 to 12 p.s.i., in order that it has an output of from 3 to 15 p.s.i. Similarly, relay 27 is biased such that an input signal of 9 to 15 p.s.i. is required for an output signal of 3 to 15 p.s.i. Heating element 41 is a 48 kw. electric heater. It will be referred to as the swing load or variable output heater since its heat output can be continuously varied. Heater elements 47 and 53 are both 24 kw. electric heaters. These are called base load heaters since they are switched on or off as demanded.

Figure 2:
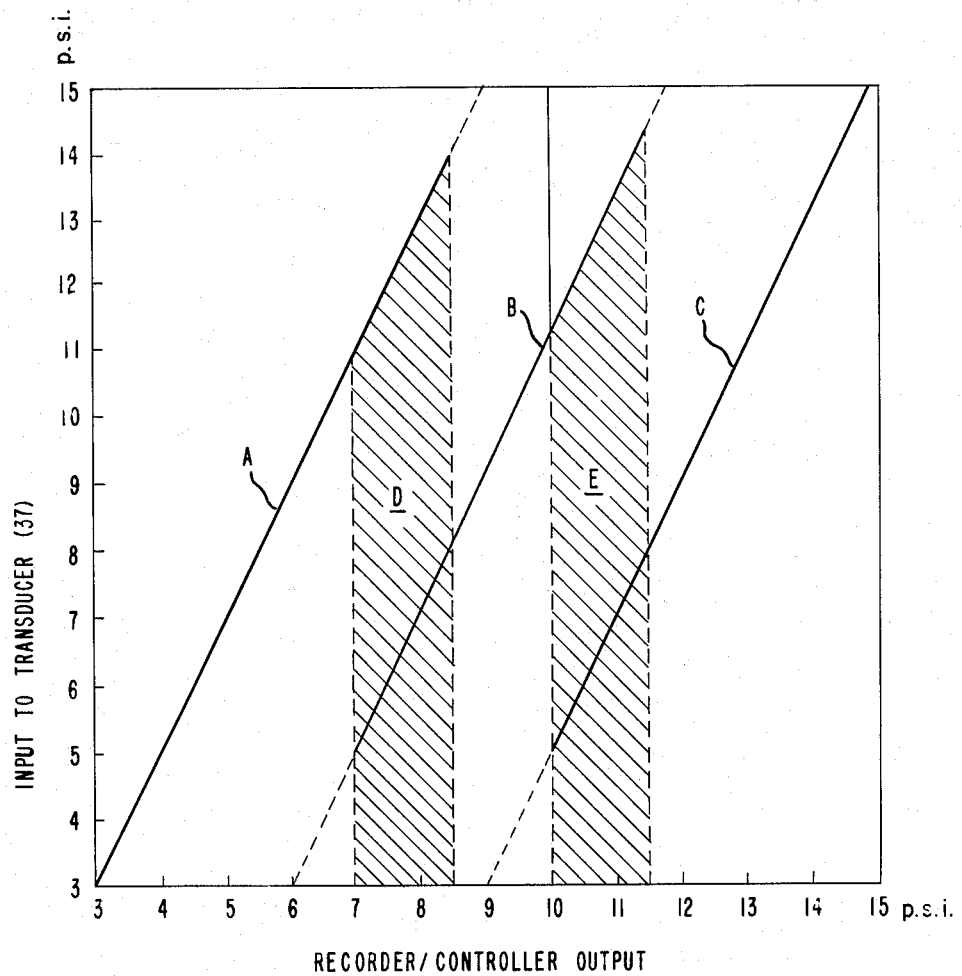
FIGURE 2 depicts graphically a stepwise variation in the power input to the continuously variable heater of the regulator system as a function of the output signal from a temperature recorder/controller.

In operation, the output of recorder/controller 18 is proportional to the heat demand. Variations in the output of controller 18 serve to vary continuously the heat output of a swing load heater 41 and at the same time to turn on or off base heating elements 47 and 53. When the output of controller 18 is below 8.5 lb./in.², pressure switches 28 and 29 are open and, therefore, solenoid valves 30 and 34 are set to pass a signal from relay 25 over line 31 through switch 30 to line 33 and through switch 34 to line 36, and therefore directly to transducer 37. In this situation, valve 30 blocks any signal from line 32 and valve 34 blocks any signal from line 35. Thus, the signal to reactor 39 and therefore the heat output through heating element 41 is directly proportional to the output signal from controller 18 in this particular range of controller output signal range. This variation is shown as Curve A in FIG. 2. When the controller output signal reaches 8.5 p.s.i., pressure switch 29 is actuated. Its output over connection 42 operates solenoid valve 30 to close the passage from line 31 and open the line from line 32. At the same time, the signal from pressure switch 29 is transmitted over connection 43 to power relay 45 and switches on base heating element 47. The signal to reactor 39 now comes from amplifier 26 instead of 25. Since amplifier 26 is biased to require an input signal range of 6–12 p.s.i. to give an output signal of 3–15 p.s.i., the power passed by reactor 39 and therefore the input power through heating element 41 is immediately rdeuced and then follows the curve as shown by Curve B in FIGURE 2. If the output signal from controller 18 continues to rise, the input through heater 41 is increased continuously, as shown schematically on Curve B of FIG. 2, as a result of the signal passing from relay 26 through valve 30, valve 34, transducer 37 and reactor 39. If the signal increases to a level of 11.5 p.s.i., pressure switch 28 is now actuated. The signal from switch 28 operates the solenoid of valve 34 and now blocks signals from line 33 and passes signals from line 35 to line 36. At the same time, the signal from switch 28 is transmitted over line 49 to power relay 51, thus turning on base heating element 53. Relay 27 is biased such that it requires an input signal in the range 9–15 p.s.i. to yield an output signal in the range 3–15 lb./in.². Thus, as base heater 53 is switched on, the input through heater 41 is again simultaneously reduced substantially equally. Input to heater 41 then follows Curve C in FIG. 2. The magnitudes of the negative bias in amplifying relays 26 and 27 are such that incremental power decreases passed through the reactor 39 will be equal to the incremental increases from switching on the associated base load heater 47 and 53. This has the important advantage of resulting in no sudden large demand and, therefore, no upset to either the electric supply source 54 or sudden increase in temperature of process material passing through the heat exchanger.

Figure 3:
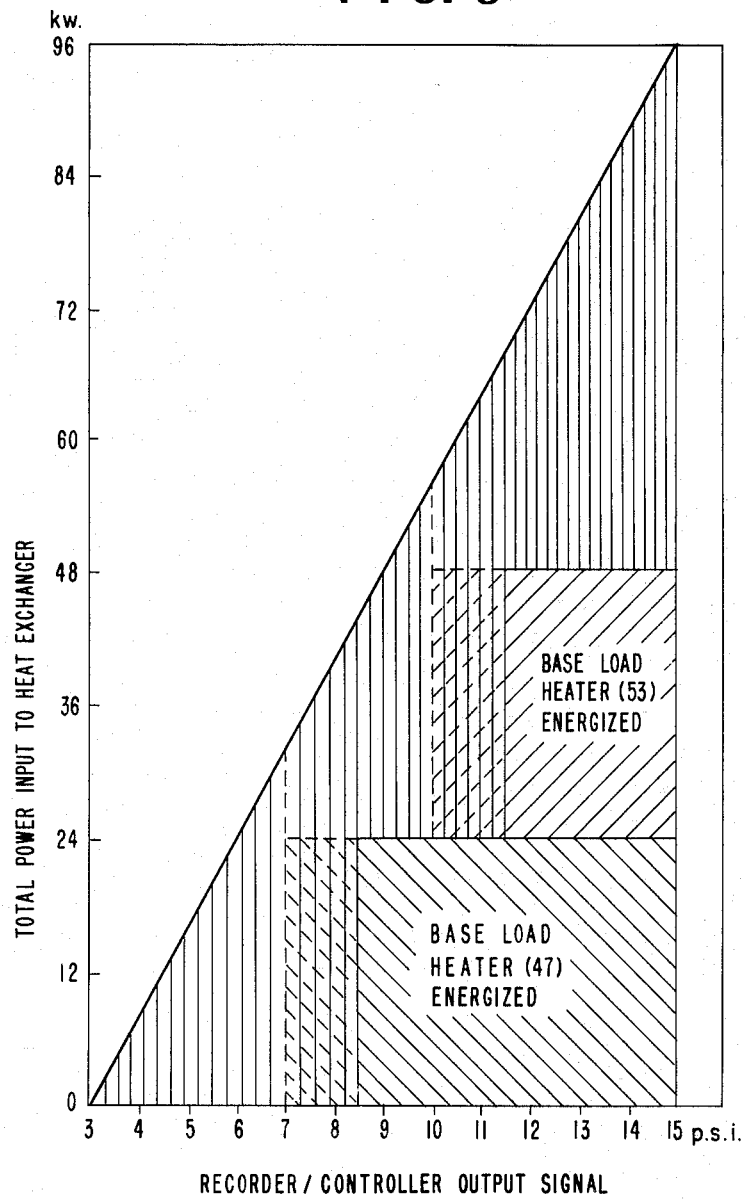
FIGURE 3 shows a graph of the total heat input to a heat exchanger in the system as a function of the output of the temperature recorder/controller.

An additional operational advantage arises out of the set differential between the actuating and deactuating pressure limits of pressure switches 28 and 29 as noted above. For example, if the output from controller 18 arises above 8.5 p.s.i., and therefore, places reactor 39 under control of relay 26 as shown on Curve B of FIG. 2, and if the output signal from controller 18 now decreases below 8.5 lb./in.², pressure switch 29 will not be deactivated until output signal from controller 18 falls to a level below 7 p.s.i. There is a similar overlap for switch 28. These are illustrated as shaded areas D and E of FIG. 2, where the operation of reactor 39 may be under the control of either of two relays depending on prior extreme output signals from controller 18. Thus, the differential between opening and closing of pressure switches 28 or 29 results in decreased frequency of base load switching and enables the regulator to dampen small oscillations in temperature. The heat input to heat exchanger 12 can, therefore, be continuously varied in a manner similar to that shown in FIG. 3, even though components of the heat input are step-wise changed as base load heaters are switched on and off. When the final control element of the swing load is not perfectly linear, the perfectly linear theoretical curve of FIG. 3 is a limiting case which is only approached by refinements such as employing smaller pressure differentials in pressure switches 28 and 29.

Equally important is the result that the demand from the power source is uniformly varied with no sudden demands so that there will be no upset on the electrical power supply system during the wide range of demand possible.

This invention has been illustrated above for a temperature regulating apparatus in which temperature is varied by means of an electrically heated heat exchanger and regulation is arrived at through pneumatic, electrical or electro-pneumatic circuit elements. Additional embodiments or modifications will be apparent to one skilled in the art without departure from the inventive concept, which accordingly, is intended to be limited only by the scope of the following claim.

I claim:

In a system for controlling a variable condition, including a sensor for the condition and a monitoring device for generating a signal in response to a variation in said condition; first means for influencing said condition comprising a first element of variable output; second means for influencing said condition comprising at least one additional element having a fixed output which is less than the maximum output of said first element; a first amplifying relay responsive to the signal generated by said monitoring device and operatively coupled with said first means to control its output; a second amplifying relay responsive to the signal generated by said monitoring device and operatively coupled with said first means to control its output, the second amplifying relay being arranged to bias its control of the output of said first means at values reduced by the value of the fixed output of said second means; a third signal translating means having two operative conditions in response to the signal from the monitoring device, the signal translating means being operative in one condition, when the signal from the monitoring device causes the first amplifying relay to control the output of said first means near its maximum, to switch control of said first means from the first amplifying relay to the second amplifying relay and simultaneously switch on the output of said second means, and being operative in the other condition, when the signal from the monitoring device decreases to a predetermined level below the level at which the first amplifying relay controls the output of said first means near its maximum, to switch control of said first means from the second amplifying relay to the first amplifying relay and simultaneously switch off the output of said second means.

References Cited by the Examiner

UNITED STATES PATENTS

| | | | |
|---|---|---|---|
| 1,183,925 | 5/1916 | Waters | 219—486 |
| 2,805,311 | 9/1957 | Fluegel et al. | 219—494 |
| 3,128,362 | 4/1964 | Clark et al. | 219—494 |

RICHARD M. WOOD, *Primary Examiner.*

L. H. BENDER, *Assistant Examiner.*